Patented July 17, 1951

2,560,931

UNITED STATES PATENT OFFICE 2,560,931

DEHYDRATION OF ACETONITRILE

Harold D. Chapman and William I. Denton, Woodbury, N. J., assignors to Socony-Vacuum Oil Company, Incorporated, a corporation of New York No Drawing. Application February 26, 1946, Serial No. 650,395

2 Claims. (Cl. 210—42.5)

This invention relates to the dehydration of acetonitrile, and is more particularly concerned with an improved method for effecting the dehydration of acetonitrile.

As is well known to those familiar with the art, in the preparation of acetonitrile, the latter becomes contaminated with impurities. One of the chief impurities is water.

The separation of water from acetonitrile-water mixtures presents unusual difficulties for two reasons. In the first place, acetonitrile and water are miscible in all proportions and manifest a high degree of affinity for each other; and in the second place, acetonitrile and water form a constant boiling mixture or azeotropic mixture, thereby precluding direct separation into pure constituents by means of distillation.

In view of the foregoing, several methods have been proposed to effect the dehydration of acetonitrile. Of these, two have found commercial application. One method involves the addition of a water-soluble salt, such as calcium chloride, potassium carbonate, and the like, to the acetonitrile-water mixtures. This has two effects, first, if there are large amounts of water present in the mixtures, the salt, by decreasing the mutual solubility of the acetonitrile and water, causes most of the water to be thrown out by a "salting out" effect, whereby it may be subsequently easily separated by decantation, for example; and secondly, if after this initial separation of water, additional amounts of salt are added, the latter, such as calcium chloride, having a strong affinity for water, will preferentially take up the residual water still present in the mixture. In this manner, a fairly dry product may be obtained. The other method involves the azeotropic distillation of the acetonitrile-water mixtures through the use of substances such as benzene, toluene, and the like. By adding benzene, for example, to the binary acetonitrile-water mixtures, ternary mixtures are formed from which water can be easily separated.

From a commercial standpoint, the disadvantages of the first method are the cost of the materials employed, while the disadvantages of the second method are the cost of the extra heat required in the distillation, the necessity of separating the entraining liquid, and the cost involved in the loss of entraining liquid.

We have now found a method for dehydrating acetonitrile-water mixtures which is simple and commercially feasible and which does not suffer from the disadvantages of the methods of the prior art.

We have discovered that mixtures of acetonitrile and water can be completely dehydrated for all practical purposes by treating the mixtures with activated alumina. Silica gel, commercial bead catalyst, and special drying type beads have been found to be ineffective in this respect.

Accordingly, it is an object of the present invention to provide a method for dehydrating acetonitrile. Another object is to provide a method for dehydrating water-contaminated acetonitrile which is simple and commercially feasible. An important object is to afford an efficient, method for effecting the dehydration of water-contaminated acetonitrile. Other objects and advantages of the present invention will become apparent to those skilled in the art from the following description.

Broadly stated, the present invention provides an efficient method for dehydrating acetonitrile-water mixtures, which comprises contacting said mixtures, in the liquid phase, with activated alumina.

In general, any acetonitrile-water mixture can be effectively treated in accordance with the method of our invention. From the standpoint of operativeness of our method, there appears to be nothing critical in the amount of water present in the acetonitrile-water mixtures that can be treated. Hence, it must be clearly understood that any reference to amounts of water present in acetonitrile-water mixtures made herein must not be construed to be a limitation in any manner. From the standpoint of commercial feasibility, our process is applicable to any acetonitrile-water mixtures containing up to about 25% by volume of water, more particularly, up to about 16% by volume of water, and especially up to about 10% by volume of water.

The method of our invention is applicable to the dehydration of acetonitrile-water mixtures present in the reaction products obtained in the process for the production of nitriles set forth in a number of copending applications of which application Serial Number 645,012, filed February 1, 1946, now U. S. Patent No. 2,450,637, is typical Such reaction products ordinarily comprise mixtures of water-contaminated acetonitrile, hydrocarbon reactant and ammonia. For example, one such reaction product may contain about 15% by volume of the water-contaminated acetonitrile, the remaining 85% being substantially a mixture of hydrocarbon reactant and ammonia. With such reaction products it is feasible, in accordance with our method, to dehydrate water-contaminated acetonitrile constituents of such reaction products containing as much as about 50% by volume, of water, the diluent effect of the hydrocarbon reactant and ammonia present in such reaction products rendering such an operation commercially practicable.

As stated hereinbefore, acetonitrile and water form a constant-boiling mixture or azeotropic mixture. This azeotropic mixture contains about 16% by volume of water and boils at a temperature of 168.8° F. which is below the boiling point of acetonitrile, the latter boiling at a temperature of 179.6° F. Therefore, a measure of the dryness of acetonitrile is the number of cubic centimeters of material which boil below a given temperature, for example, 176° F. Accordingly, and for the purpose of the present discussion, the measure of dryness or a measure of the amount of water remaining in the acetonitrile is defined as the number of cubic centimeters of material (acetonitrile) which boil below 176° F. per 100 c. c. of sample. On this basis, commercial acetonitrile gives 4.2 c. c., while wet acetonitrile dried with anhydrous potassium carbonate gives 4.4 c. c.

The activated alumina to be used in the method of the present invention is the activated alumina known to the art which is used as a catalyst in a wide variety of reactions. As is well known to those familiar with the art, the activated alumina may be prepared by several standard methods. For example, alumina may be activated by heating at elevated temperatures such as about 930° F. to about 1470° F. and/or treatment with steam or acid. When the activated alumina loses its activity, it may be regenerated by heating at temperatures similar to those used in activating it, suitably followed by a treatment with steam or acid. The regeneration treatment may be repeated as often as is necessary or desired without any apparent loss in the required activity of the alumina. In view of the ease of regeneration and its low incipient cost, the use of activated alumina in our method is highly economical.

The action of the activated alumina is essentially one of adsorption. Therefore, as it will be appreciated by those skilled in the art, the proportions of activated alumina to be used in any given case, using contact times which are practical in commercial operation, will depend upon the amount of water present in the acetonitrile to be dehydrated.

In accordance with the present invention, the acetonitrile to be dehydrated is contacted with activated alumina in the liquid phase and at temperatures below about 200° F., preferably, at temperatures varying between about 35° F. and about 100° F. The pressure employed must be sufficient to maintain the acetonitrile in the liquid phase at the temperature of treatment. Temperatures above about 200° F. should be avoided. We have found that treatment at temperatures above about 200° F. does not materially reduce the water content of the acetonitrile undergoing treatment and that substantial portions of the acetonitrile are hydrolyzed into acetic acid.

The method of the present invention may be carried out as a batch, continuous or semicontinuous type of operation. From the standpoint of efficiency, whether the process is carried out on a batch or continuous basis, it is important that the acetonitrile to be dehydrated be intimately contacted with the activated alumina. This may be effected in several ways and in apparatus both well known in the art.

The following detailed example is submitted for the purpose of illustrating a mode of carrying out the method of our invention. It is to be understood that the invention is not to be considered as limited to the specific conditions of operation set forth therein.

*Example*

675 grams of acetonitrile containing about 3.5% by volume, of water were passed through a tube filled with 382 grams of activated alumina, at a temperature of 86° F., over a period of six hours. The results obtained were as follows:

| Material | cc./100 cc. of sample boiling below 176° F. |
|---|---|
| Charge: Acetonitrile with 3.5% Water | 26.8 |
| Product of Treatment | 0.1 |
| Commercial Acetonitrile | 4.2 |

The present invention may be embodied in other specific forms without departing from the spirit or essential attributes thereof, and it is therefore desired that the present embodiments be considered in all respects as illustrative and not restrictive, reference being had to the appended claims rather than to the foregoing desciption to indicate the scope of the invention.

We claim:

1. The method of producing substantially anhydrous acetonitrile from water-contaminated acetonitrile, which comprises contacting water-contaminated acetonitrile with activated alumina, at a temperature falling within the range varying between about 35° and less than about 200° F., and under sufficient pressure to maintain the water-contaminated acetonitrile in the liquid phase.

2. The method of producing substantially anhydrous acetonitrile from water-contaminated acetonitrile, which comprises contacting water-contaminated acetonitrile with activated alumina, at a temperature falling within the range varying between about 35° and about 100° F., and under sufficient pressure to maintain the water-contaminated acetonitrile in the liquid phase.

HAROLD D. CHAPMAN.
WILLIAM I. DENTON.

REFERENCES CITED

The following references are of record in the file of this patent:

UNITED STATES PATENTS

| Number | Name | Date |
|---|---|---|
| 2,059,553 | Churchill | Nov. 3, 1936 |
| 2,107,904 | Pool | Feb. 8, 1938 |
| 2,316,499 | Broglin | Apr. 13, 1943 |
| 2,322,316 | Rummelsburg | June 22, 1943 |
| 2,323,524 | Downs | July 6, 1943 |

OTHER REFERENCES

Activated Alumina, 1938, by Aluminum Ore Co., East St. Louis, Illinois.